(12) United States Patent
Itani

(10) Patent No.: US 10,510,085 B2
(45) Date of Patent: Dec. 17, 2019

(54) TIME AND LOCATION AWARE CUSTOMER RELATIONSHIP MANAGEMENT

(71) Applicant: SugarCRM Inc., Cupertino, CA (US)

(72) Inventor: Majed Itani, San Jose, CA (US)

(73) Assignee: SUGARCRM INC., Cupertino, CA (US)

( * ) Notice: Subject to any disclaimer, the term of this patent is extended or adjusted under 35 U.S.C. 154(b) by 493 days.

(21) Appl. No.: 13/844,454

(22) Filed: Mar. 15, 2013

(65) Prior Publication Data

US 2014/0278665 A1 Sep. 18, 2014

(51) Int. Cl.
*G06Q 30/02* (2012.01)
*G06Q 30/00* (2012.01)

(52) U.S. Cl.
CPC ......... *G06Q 30/0201* (2013.01); *G06Q 30/01* (2013.01)

(58) Field of Classification Search
CPC ........................... G06Q 30/01; G06Q 30/0201
USPC ......................................................... 705/7.18
See application file for complete search history.

(56) References Cited

U.S. PATENT DOCUMENTS

| 6,732,080 | B1* | 5/2004 | Blants .................. | G06Q 10/109 |
| | | | | 705/7.18 |
| 2003/0028402 | A1* | 2/2003 | Ulrich .................... | G06Q 10/10 |
| | | | | 705/3 |
| 2003/0204474 | A1* | 10/2003 | Capek ................... | G06Q 10/109 |
| | | | | 705/64 |
| 2004/0059584 | A1* | 3/2004 | Yoon ...................... | G06Q 10/10 |
| | | | | 705/301 |
| 2008/0133336 | A1* | 6/2008 | Altman .............. | G06Q 30/0207 |
| | | | | 455/456.1 |
| 2008/0248815 | A1* | 10/2008 | Busch ................... | H04W 4/029 |
| | | | | 455/456.5 |
| 2010/0049599 | A1* | 2/2010 | Owen .................... | G06Q 30/02 |
| | | | | 705/14.4 |

(Continued)

OTHER PUBLICATIONS

Jesdanun, Anick. Coming soon: Mobile devices that reveal where you are. The Charleston Gazette [Charleston, W.V] Oct. 30, 2000: 1D. 5 pgs.*

(Continued)

*Primary Examiner* — Timothy Padot
(74) *Attorney, Agent, or Firm* — Steven M. Greenberg, Esq.; Shutts & Bowen LLP

(57) ABSTRACT

A method, system and computer program product for time and location aware customer relationship management (CRM) is provided. A method for time and location aware CRM includes obtaining a location for a mobile computing device, forwarding the location to a CRM application, and responding to an identification of a contact in the CRM application that is proximate to the obtained location, by retrieving a related data record for the contact from the CRM application and by displaying the related record in the mobile computing device in a user interface for the CRM application. Further, a current time for the mobile computing device can be obtained and forwarded to the CRM application. Responsive to identifying a meeting in the CRM application that is scheduled proximate to the obtained time, a related data record for the meeting can be retrieved from the CRM application and displayed in the mobile computing device.

3 Claims, 1 Drawing Sheet

(56) References Cited

U.S. PATENT DOCUMENTS

| | | | | |
|---|---|---|---|---|
| 2010/0124937 A1* | 5/2010 | Vogel | ............ | G06Q 30/02 455/466 |
| 2011/0022424 A1* | 1/2011 | VonDerheide | ......... | G01C 21/20 705/5 |
| 2012/0005023 A1* | 1/2012 | Graff | ............ | G06Q 30/0201 705/14.58 |

OTHER PUBLICATIONS

GeoLife: GeoLife Announces Navmii, Windows Mobile Satellite Navigation with Friend-Find Local Based Service; New GPS sat-nav system features integrated social navigation location based services built on the GeoLife Framework. Anonymous.M2 Presswire [Coventry] Dec. 15, 2008. 4 pgs.*

* cited by examiner

TIME AND LOCATION AWARE CUSTOMER RELATIONSHIP MANAGEMENT

BACKGROUND OF THE INVENTION

Field of the Invention

The present invention relates to customer relationship management (CRM) data processing and more particularly to environmentally influenced operation of CRM data processing.

Description of the Related Art

CRM refers to the interaction that a business entity enjoys with its customers, whether the business entity provides sales or services to the customer. CRM is often thought of as a business strategy that enables business managers to understand the customer, to retain customers through better customer experience, to attract new customers, increase profitability and to decrease customer management costs. In real terms, however, CRM systems are used specifically to manage business contacts, clients, contract wins and sales leads. As such, CRM solutions provide the end user with the customer business data necessary to provide services or products desired by the customers, to provide better customer service, to cross-sell and to up-sell more effectively, to close deals, retain current customers and understand the identity of the customer.

The advent of the Internet has changed the changed the way in which end users approach CRM strategies because advances in technology have also changed consumer buying behavior and especially the way in which businesses communicate with customers and collect data about those customers. More than the past, self-service channels such as the World Wide Web ("Web") and more recently, the mobile computing world, have become the norm rather than the exception leading to easier ways in which to manage customer information electronically. Most importantly, the mobility of business agents and the widespread usage of mobile computing devices, both have resulted in the required adaptation of CRM data processing systems to mobile computing.

Location based computing has emerged as an essential component of mobile computing finding wide application not only in traditional personal computing, but also amongst various pervasive devices including tablet computers, smartphones and personal digital assistants. Location based computing generally refers to a general class of computer program-level services used to include specific controls for location and time data as control features in computer programs. As such location based computing has proven an important aspect of a number of types of applications—particularly in the social networking and entertainment spaces.

Location based computing provides services to identify a location of a person or object or the whereabouts of a friend or employee. Location based computing also provides services for parcel tracking and vehicle tracking. Location based computing yet further supports mobile commerce when taking the form of coupons or advertising directed at customers based upon the contemporaneous location of the consumer. Finally, location based computing provides personalized weather services and even location-based games. In the context of CRM, location based services support both mobile resource management and field force management. Field force management in CRM refers to the scheduling, dispatching and optimization of teams of technicians in the field so as to minimize costs while meeting customer demands. Comparably, mobile resource management refers to the scheduling, dispatching, routing, re-routing and optimization of assets such as vehicles into the field so as to minimize costs while meeting customer demands.

BRIEF SUMMARY OF THE INVENTION

Embodiments of the present invention address deficiencies of the art in respect to location based services in CRM data processing and provide a novel and non-obvious method, system and computer program product for time and location aware CRM. In an embodiment of the invention, a method for time and location aware CRM is provided. The method includes obtaining a location for a mobile computing device, forwarding the location to a CRM application, and responding to an identification of a contact in the CRM application that is proximate to the obtained location, by retrieving a related data record for the contact from the CRM application and by displaying the related record in the mobile computing device in a user interface for the CRM application. Further, a current time for the mobile computing device can be obtained and forwarded to the CRM application. Responsive to identifying a meeting in the CRM application that is scheduled proximate to the obtained time, a related data record for the meeting can be retrieved from the CRM application and displayed in the mobile computing device in a user interface for the CRM application.

In one aspect of the embodiment, the location is obtained from global positioning satellite (GPS) data for the mobile computing device. In another aspect of the embodiment, the location is obtained from network data received in the mobile computing device. In yet another aspect of the embodiment, data extrinsic to the CRM application can be additionally retrieved from over the Internet and displayed in the mobile computing device in a user interface for the CRM application.

In another embodiment of the invention, a CRM data processing system is provided. The system can include a host computing system that includes at least one computer with memory and at least one processor. The system also can include a CRM application executing in the host computing system. Finally, the system can include a location and time service module coupled to the CRM application. The module can include program code enabled upon execution in the memory of the host computing system to obtain a location for a mobile computing device communicatively coupled to the CRM application, and to respond to an identification of a contact in the CRM application that is proximate to the obtained location by retrieving a related data record for the contact from the CRM application and to return the related record to the mobile computing device for display in a user interface for the CRM application.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for time and location aware CRM. In accordance with an embodiment of the invention, a CRM user interface for a CRM application can be rendered within a display of a mobile computing device. A location of the mobile computing device can be ascertained for example by way of GPS data, or data embedded within a network signal coupling the mobile computing device to the CRM application. Additionally, a time of day can be determined at the location. The location data, as well as the time data, can be provided to the CRM application and contact data for one or more contacts associated with either the location or the time can be returned to the mobile computing device for display within the GUI. Further, data extrinsic to the CRM application can be sourced for the contacts from one or more data stores disposed over a computer communications network and accessible by the CRM application. The extrinsic data also can be returned to the mobile computing device for display in the user interface. In this way, location and time relevant data in the CRM application can be provided to the mobile computing device contemporaneously with the presence of the mobile computing device at the location at the specified time.

Figure 1:
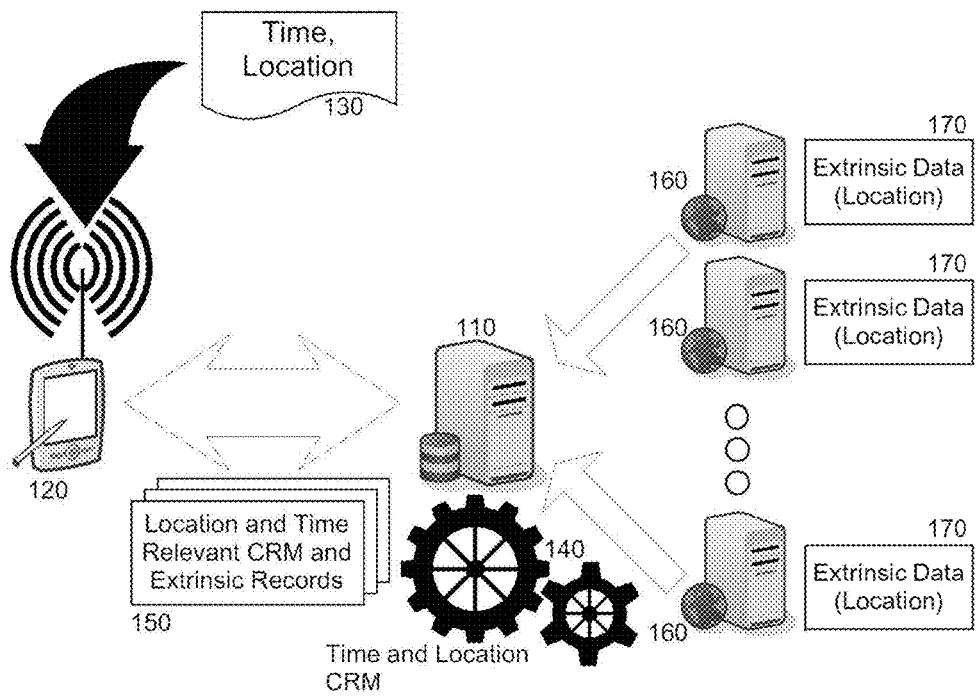
FIG. 1 is a pictorial illustration of a process for time and location aware CRM.

In further illustration, FIG. 1 pictorially shows a process for time and location aware CRM. As shown in FIG. 1, a mobile device 120 can provide a user interface to CRM data from a CRM data processing system 110. As the mobile device 120 travels from location to location, from time to time, a contemporaneous time and location 130 for the mobile device 120 can be determined, for example by way of GPS data, or cellular network data, or data communications network data. Thereafter, the contemporaneous time and location data 130 can be provided to time and location CRM logic 140 which in turn can identify one or more contacts in the CRM data processing system 110 corresponding to the contemporaneous time and location data 130.

For example, the contacts can be determined based upon meeting records scheduled at a time, a location or both, that is proximate to the contemporaneous time and location data 130. As another example, contacts in the CRM data processing system 110 with an address proximate to the specified location of the contemporaneous time and location data 130 can be determined. In either circumstance, associated CRM data 150 related to the contact or contacts can be located in the CRM data processing system 110 and returned to the mobile device 120 for display in a corresponding user interface. Optionally, time and location CRM logic 140 can retrieve data 170 that is extrinsic to the CRM data processing system 160 from external data sources 160 communicatively coupled to the CRM data processing system 110.

The extrinsic data 170 can be related to the contacts, such as recent news items or portions of a Web site provided by the contacts, a mapping or directions to a specified location of a scheduled meeting to the extent that the location data exceeds a threshold distance from the specified location, or other such ancillary information. Once retrieved, the extrinsic data 170 also can be provided to the mobile device 120 for display in the user interface to the CRM data processing system 110.

Figure 2:
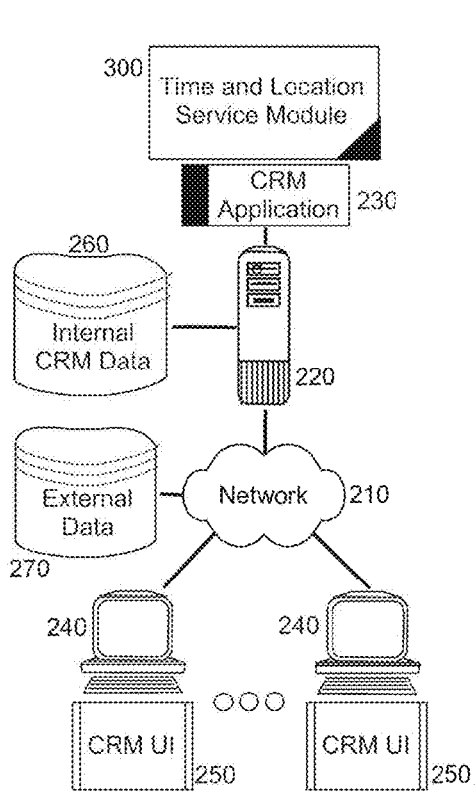
FIG. 2 is a schematic illustration of a CRM data processing system configured for time and location aware CRM; and, FIG. 3 is a flow chart illustrating a process for time and location aware CRM.

The process described in connection with FIG. 1 can be implemented within a CRM data processing system. In yet further illustration, FIG. 2 schematically shows a CRM data processing system configured for time and location aware CRM. The system can include a host computing system 220 that includes one or more computers each with at least one processor and memory. The host computing system 220 can support the operation of a CRM application 230 which can be accessed by different end users over computer communications network 210. In this regard, the CRM application 230 can be accessed by the end users by way of a user interface 250 to the CRM application 230 rendered within respectively different mobile computing devices 240, such as laptop computers, personal digital assistants, tablet computers, smartphones and the like.

Of note, a time and location service module 300 can be coupled to the CRM application 230. The module 300 can include program code enabled upon execution in memory of a computer of the host computing system 220 to identify one or more contacts within the CRM application 230 corresponding to time and location data provided by one of the mobile computing devices 240. For example, the contacts can be people or businesses that are known within the CRM application 230 to be proximate to the location data. To the extent that multiple contacts listed in the CRM application 230 are proximate to the location data, a listing of those contacts can be provided to the end user and the end user can select one of the contacts in the listing as the identified contact.

The program code of the module 300 further can be enabled to locate within an internal data store 260 of the CRM application 230 one or more relevant data records related to the identified contacts and to return the relevant data records to the one of the mobile computing devices 240 for display within a corresponding user interface 250. Even further, the program code of the module 300 can be enabled to locate in one or more external data stores 270, information relevant to the contacts or a location indicated for the one of the mobile computing devices 240 and to return the relevant information from the external data stores 270 to the one of the mobile computing devices 240 for display in the corresponding user interface 250.

Figure 3:
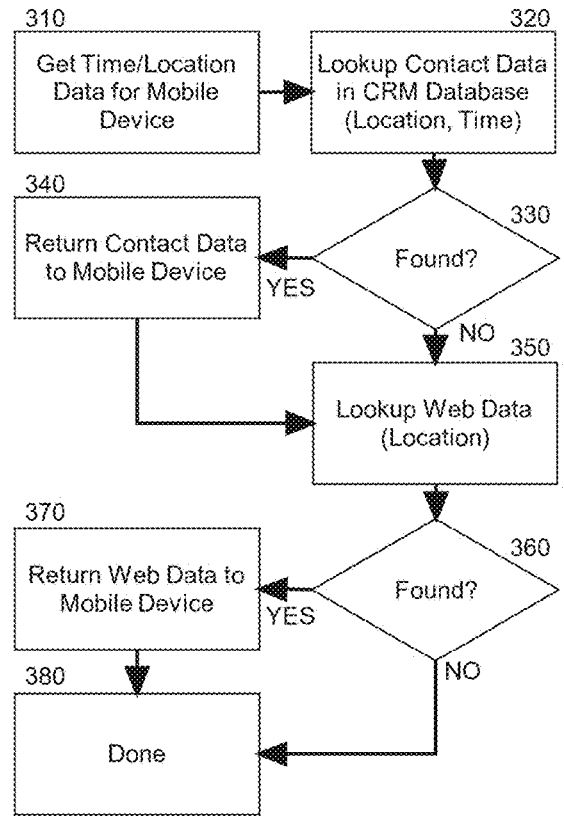

In yet further illustration of the operation of the time and location service module 300, FIG. 3 is a flow chart illustrating a process for time and location aware CRM. Beginning in block 310, the contemporaneous location, time or both for a mobile device can be determined and in block 320 it can be determined whether or not one or more contacts associated with the location, time or both can be identified within a CRM application. In decision block 330, if one or more contacts of the CRM application can be located in connection with the location, time or both, in block 340 data records related to the contact can be returned to the mobile device for display therein. For example, the data records can include a history of interactions with the contact, a listing of key employees, customers or products, or general background information, to name only a few relevant data records.

In block 350, in addition to locating relevant data records intrinsic to the CRM application, the World Wide Web can be searched for data that is extrinsic to the CRM application but related to the contact, the location or both. In decision block 360, if extrinsic data can be located, in block 370 the located extrinsic data can be returned to the mobile device for display in the user interface. Finally, in block 380 the process can end.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A method for time and location aware customer relationship management (CRM), the method comprising:
   establishing a communicative connection between a CRM application executing in memory of a host computing system and a mobile computing device of an end user of the CRM application over a computer communications network;
   storing one or more contacts of the CRM application in memory of the host computing system wherein each of the contacts comprise one or more related data records for each of the contacts;
   obtaining a location for the mobile computing device from global positioning satellite (GPS) data for the mobile computing device and obtaining a current time in the mobile computing device;
   forwarding the location and the current time to the CRM application;
   responsive to identifying a meeting in the CRM application that is scheduled proximate to the obtained time, retrieving a related meeting data record for the meeting from the CRM application wherein the related meeting data record comprises directions from the location of the mobile computing device to a location of the meeting and displaying the related meeting data record in the mobile computing device in a user interface for the CRM application; and,
   responsive to identifying a contact in the CRM application from the one or more contacts of the CRM application that is proximate to the obtained location, retrieving a related data record for the contact from the CRM application wherein the related data record for the contact comprises a name of the contact, an address of the contact, a listing of key employees of the contact, a listing of key products of the contact and a history of interactions with the contact, additionally retrieving data extrinsic to the CRM application from over the Internet wherein the extrinsic data comprises a portion of a web site provided by the contact that is unrelated to the location of the contact and unrelated to the location of the mobile computing device, and displaying the related data record and the extrinsic data in the mobile computing device of the end user of the CRM application in the user interface for the CRM application.

2. A customer relationship management (CRM) data processing system comprising:
   a host computing system comprising at least one computer with memory and at least one processor;
   a CRM application executing in the host computing system; and,
   a location and time service module coupled to the CRM application, the module comprising program code enabled upon execution in the memory of the host computing system to establish a communicative connection between the CRM application and a mobile computing device of an end user of the CRM application coupled to the CRM application over a computer communications network, to store one or more contacts of the CRM application in memory of the host computing system wherein each of the contacts comprise one or more related data records for each of the contacts, to obtain a location for the mobile computing device communicatively coupled to the CRM application from global positioning satellite (GPS) data for the mobile computing device and to obtain a current time in the mobile computing device, to forward the location and the current time to the CRM application, to respond to an identification of a meeting in the CRM application that is scheduled proximate to the obtained time by retrieving a related meeting data record for the meeting from the CRM application wherein the related meeting data record comprises directions from the location of the mobile computing device to a location of the meeting and to return the related meeting data record to the mobile computing device of the end user of the CRM application for display in a user interface for the CRM application, and to respond to an identification of a contact in the CRM application from the one or more contacts of the CRM application that is proximate to the obtained location by retrieving a related data record for the contact from the CRM application wherein the related data record for the contact comprises a name of the contact, an address of the contact, a listing of key employees of the contact, a listing of key products of the contact and a history of interactions with the contact by additionally retrieving data extrinsic to the CRM application from over the Internet wherein the extrinsic data comprises a portion of a web site provided by the contact that is unrelated to the location of the contact and unrelated to the location of the mobile computing device, and to return the related data record and the extrinsic data to the mobile computing device of the end user of the CRM application for display in the user interface for the CRM application.

3. A computer program product for time and location aware customer relationship management (CRM), the computer program product comprising:
   a non-transitory computer readable storage memory device having computer readable program code embodied therewith, the computer readable program code comprising:
   computer readable program code for establishing a communicative connection between a CRM application executing in memory of a host computing system and a mobile computing device of an end user of the CRM application over a computer communications network;
   computer readable program code for storing one or more contacts of the CRM application in memory of the host computing system wherein each of the contacts comprise one or more related data records for each of the contacts;

computer readable program code for obtaining a location for the mobile computing device from global positioning satellite (GPS) data for the mobile computing device and obtaining a current time in the mobile computing device; computer readable program code for forwarding the location and the current time to the CRM application; computer readable program code for responding to identification of a meeting in the CRM application that is scheduled proximate to the obtained time, by retrieving a related meeting data record for the meeting from the CRM application wherein the related meeting data record comprises directions from the location of the mobile computing device to a location of the meeting and by displaying the related meeting data record in the mobile computing device in a user interface for the CRM application; and, computer readable program code for responding to an identification of a contact in the CRM application from the one or more contacts of the CRM application that is proximate to the obtained location, by retrieving a related data record for the contact from the CRM application wherein the related data record for the contact comprises a name of the contact, an address of the contact, a listing of key employees of the contact, a listing of key products of the contact and a history of interactions with the contact, by additionally retrieving data extrinsic to the CRM application from over the Internet wherein the extrinsic data comprises a portion of a web site provided by the contact that is unrelated to the location of the contact and unrelated to the location of the mobile computing device, and by displaying the related data record and the extrinsic data in the mobile computing device of the end user of the CRM application in the user interface for the CRM application.

* * * * *